United States Patent
Skocek et al.

(10) Patent No.: US 11,753,340 B2
(45) Date of Patent: Sep. 12, 2023

(54) PROCESS AND DEVICE FOR CARBONATING CONCRETE WASTE AND/OR SEQUESTERING $CO_2$

(71) Applicant: HConnect 2 GmbH, Heidelberg (DE)

(72) Inventors: Jan Skocek, Leimen (DE); Maciej Zajac, Heidelberg (DE); Mohsen Ben Haha, Heidelberg (DE); Stefan Federhen, Hirschberg (DE); Marek Majchrowicz, Olszowa (PL)

(73) Assignee: HConnect 2 GmbH, Heidelberg (DE)

( * ) Notice: Subject to any disclaimer, the term of this patent is extended or adjusted under 35 U.S.C. 154(b) by 168 days.

(21) Appl. No.: 17/602,453

(22) PCT Filed: May 25, 2020

(86) PCT No.: PCT/EP2020/064427
§ 371 (c)(1),
(2) Date: Oct. 8, 2021

(87) PCT Pub. No.: WO2020/239683
PCT Pub. Date: Dec. 3, 2020

(65) Prior Publication Data
US 2022/0212992 A1    Jul. 7, 2022

(30) Foreign Application Priority Data

May 28, 2019 (EP) ................ 19177076

(51) Int. Cl.
*C04B 20/02* (2006.01)
*C04B 18/167* (2023.01)
*C04B 40/02* (2006.01)
*C04B 111/00* (2006.01)

(52) U.S. Cl.
CPC .......... *C04B 20/023* (2013.01); *C04B 18/167* (2013.01); *C04B 20/026* (2013.01); *C04B 40/0231* (2013.01); C04B 2111/00017 (2013.01)

(58) Field of Classification Search
CPC ... C04B 20/023; C04B 18/167; C04B 20/026; C04B 40/0231; C04B 2111/00017; Y02P 40/18
See application file for complete search history.

(56) References Cited

U.S. PATENT DOCUMENTS

| 2,802,719 | A | 8/1957 | Avedikian |
| 2015/0210594 | A1 | 7/2015 | Achenbach |
| 2016/0046532 | A1 | 2/2016 | Juilland et al. |
| 2020/0290915 | A1 | 9/2020 | Skocek et al. |

FOREIGN PATENT DOCUMENTS

| EP | 3498681 A1 | 6/2019 |
| JP | 05238790 A | 9/1993 |
| WO | 2019115722 A1 | 6/2019 |

OTHER PUBLICATIONS

International Search Report dated Oct. 14, 2020 issued in PCT/EP2020/064427.
Hills et al: "Statistical analysis of the carbonation rate of concrete" Cement and Concrete Research, vol. 72, Jun. 2015, pp. 98-107.
Metz, P.: "Carbon dioxide Capture and Storage: Special Report of the intergovernmental panel on climate change" Cambridge University Press, 2005, p. 79.
C. E. Baukal: "Oxygen-enhanced combustion" CRC press, 2013, pp. 595-599.

*Primary Examiner* — Anthony J Green
(74) *Attorney, Agent, or Firm* — Collard & Roe, P.C.

(57) ABSTRACT

A method for manufacturing supplementary cementitious material and sequestering $CO_2$ by carbonating concrete fines has the following steps: grinding the concrete fines obtained from crushed concrete demolition waste in a mill at a temperature from 1 to 10° C. above the water dew point in a carbonating atmosphere provided by a gas containing from 10 to 99 Vol.-% $CO_2$, circulating the ground and partially carbonated concrete fines in a fluidized bed reactor in contact with the carbonating atmosphere, and withdrawing decarbonated gas and carbonated concrete fines.

23 Claims, 2 Drawing Sheets

PROCESS AND DEVICE FOR CARBONATING CONCRETE WASTE AND/OR SEQUESTERING $CO_2$

CROSS REFERENCE TO RELATED APPLICATIONS

This application is the National Stage of PCT/EP2020/065402 filed on May 25, 2020, which claims priority under 35 U.S.C. § 119 of European Application No. 19177076.7 filed on May 28, 2019, the disclosures of which are incorporated by reference. The international application under PCT article 21(2) was published in English.

BACKGROUND OF THE INVENTION

The present invention relates to a method and device for the manufacturing of carbonated concrete fines suitable as supplementary cementitious materials and a use of carbonated concrete fines obtainable by the method as supplementary cementitious material.

In view of the increasing amounts of concrete buildings being demolished and the need for more sustainable construction recycling of concrete has gained more and more attention in the recent past. Proposals are found for example in US 2015/0210594 A1 and US 2016/0046532 A1. Both documents describe concurrent grinding and carbonation of coarse crushed concrete demolition waste to enhance separation of the hardened cement paste from the aggregate. Both mention the possibility to use exhaust gas as $CO_2$ source. However, the carbonated hardened cement paste is of very variable quality and not useful as supplementary cementitious material (SCM in the following) as a rule. Not prior published application EP 17207076.5 filed on 13 Dec. 2017, EP 3 498 681 A1, focuses on the carbonated material and discloses a method for manufacturing a supplementary cementitious material from recycled concrete fines comprising providing recycled concrete fines as starting material, carbonation of the starting material to provide carbonated material and de-agglomerating the carbonated material to form the supplementary cementitious material. Although the document states that exhaust gas would be suitable as carbon dioxide, it needs either long exposure to obtain reactive SCM or concentrated carbon dioxide. In the not prior published application PCT/EP 2018/084823 filed on 13 Dec. 2018, WO 2019/115722 A1 it is described to combine exhaust gas cleaning from $CO_2$ in a stock pile or silo containing waste material rich in carbonatable Ca and/or Mg like recycled concrete fines with manufacturing of SCM from the waste material. This process achieves good $CO_2$ sequestration, but concurrent manufacturing of SCM takes long and optimal SCM reactivity is difficult to achieve without compromising $CO_2$ sequestration performance. JP H05 238790 A describes a carbonation of the fines from concrete recycling in an atmosphere of 30 to 900° C. and ≥5 Vol.-% $CO_2$ concentration. The fines are separated from the coarser fraction before carbonation. U.S. Pat. No. 2,802,719 A relates to a preparation of completely carbonated calcium carbonate in a ball mill with carbon dioxide feed and a feed for pelletized water. It reports carbonation within a few minutes by simultaneous grinding, fluidizing, heating and reacting. Again, it is not straightforward to obtain good quality product, i.e. useful as SCM, and efficient sequestration of $CO_2$ together.

SUMMARY OF THE INVENTION

Thus, the object remains to provide more sustainable building materials. This mainly concerns saving natural resources like mineral raw materials and reducing energy consumption to decrease carbon dioxide emissions. Also, sequestration of carbon dioxide is a problem not really solved, yet.

Surprisingly it has now been found, that unexpectedly reactive SCM is obtained reliably and fast when recycled concrete fines are ground in the presence of—preferably concentrated—carbon dioxide in a temperature range from 1 to 10° C. above the water dew point in a mill connected with a carbonation recirculation zone sequestering at least some of the remaining carbon dioxide and carbonating the concrete fines to a large extent. This process will also be designated as carbonation grinding herein. The obtained SCM shows higher reactivity than a product obtained by a carbonation subsequent to grinding and also compared to a product obtained from carbonation and grinding in one single device and step. The latter method can also not sequester as much carbon dioxide or needs higher $CO_2$ concentration.

Therefore, the above objects are solved by a method of carbonating concrete fines according to claim 1, comprising grinding the concrete fines obtained from crushed concrete demolition waste in a mill in the presence of a gas containing carbon dioxide in an amount from 10 to 99 Vol.-% $CO_2$ at a temperature from 1 to 10° C. above the water dew point in the mill and circulating the ground and partially carbonated concrete fines in a fluidized bed reactor connected to the mill as carbonation zone. The objects are further solved by a device for concurrent sequestering of $CO_2$ and carbonation of concrete fines comprising a mill with a separator adapted to receive concrete fines as a feed and a gas containing carbon dioxide to provide a carbonating atmosphere, a fluidized bed reactor connected to the mill with separator and adapted to receive ground and partially carbonated concrete fines and a partially decarbonted gas from the mill for circulation, temperature control means for adjustment of the temperature of the gas, and output means adapted to vent decarbonted gas and withdraw carbonated concrete fines and to recirculate the gas until it is decarbonated and the concrete fines until they are carbonated each to a desired degree. The object is further solved by using carbonated concrete fines obtainable by the method as supplementary cementitious material.

The term supplementary cementitious material (abbreviated SCM) is defined herein as materials that have pozzolanic reactivity or latent hydraulic reactivity or both, designated SCM reactivity in the following. One of the possibilities to demonstrate the SCM reactivity is to replace a part of the cement by the reactive SCM creating a binder and to compare the strength of such binder with that of the binder containing the same amount of non-reactive material. The strength of the SCM-containing binder is appreciably higher than that of the binder with non-reactive material. Hence, SCM does not include mineral additions without SCM reactivity (at least not those without an appreciable degree of SCM reactivity like limestone).

Further, to simplify the description the usual cement chemist notation for oxides: H—$H_2O$, C—CaO, A—$Al_2O_3$, F—$Fe_2O_3$, M—MgO, S—$SiO_2$ and $-$SO_3$ is used. Also, compounds are mostly named by the pure form, without explicit mentioning of solid solutions, foreign ion substitution and impurities etc. as are usual in technical and industrial materials. As one of ordinary skill in the art knows, the exact composition of phases may vary due to substitution with foreign ions. Such compounds are comprised when mentioning the pure form herein unless it is expressly stated otherwise.

Cement designates a material that, after mixing with an aqueous liquid to form a paste, is able to develop mechanical strength by hydraulic reaction. Thus, cement mostly denotes a clinker ground with or without further components, but also mixtures like super sulphated cement, geopolymer binder, and hydraulic materials not obtained by sintering like dicalcium silicate obtained by hydrothermal treatment. Composite binder or binder mixture means a mixture containing cement and a supplementary cementitious material. A binder comprises at least cement and is usually used adding water or another liquid and mostly also aggregate to form a paste. Typically, admixtures and/or additives are added to the binder and/or the paste.

According to the invention, the fines resulting from concrete demolishing are converted into supplementary cementitious material. Recycled concrete fines (abbreviated RCF) designates the material obtained after crushing concrete demolition waste and separating the particles reusable as aggregate and, if applicable, any foreign matter contained. The exact composition and particle size distribution of the concrete fines depends on the original binder and composition used in the concrete and on the demolishing and grinding procedures applied. Usually, the original aggregate is separated as much as possible and the RCF contain mostly the ground hardened binder paste together with fine sand/aggregates, usually in amounts of 30 to 80 wt.-% of the total material weight.

The use of such RCF in cement and concrete manufacturing is challenging due to inappropriate properties such as high water demand and low (next to no) SCM reactivity. However, carbonation can provide the needed SCM reactivity. Concrete and other cement-based materials undergo a natural carbonation. For structures, the process is slow and only a surface layer is carbonated, see e.g. Hills et al, "Statistical analysis of the carbonation rate of concrete", Cement and Concrete Research, Vol. 72, June 2015, pages 98-107, abstract found at http://www.sciencedirect.com/science/article/pii/S0008884615000496?via%3Dihub. The average carbonation rate of 1999 cases was 4.078 mm/year$^{0.5}$ implying that after e.g. 50 years of service life, the average carbonation depth will be lower than 29 mm. Hence, most of the concrete remains non-carbonated. During recycling, the concrete is crushed into smaller particles that, upon exposure to ambient atmosphere, carbonate readily to a certain extent but by far not enough for the use as SCM according to the invention. This carbonation is also designated natural carbonation herein. Typically, the carbonation during concrete recycling can be simulated by exposing fresh hardened concrete to an atmosphere with 0.04 Vol-% $CO_2$ at 65% relative humidity (RH) for one week, providing the material is finely ground, i.e. below 200 μm. Compared to a natural carbonation defined like this the carbonated RCF used as SCM according to the invention contains at least 1.25 times, preferably 1.5 times, most preferred 1.75 times more $CO_2$ than is bound by natural carbonation. Typically, the SCM contains calcium carbonate with at least 30 wt-% of the calcium carbonate being other polymorphs than calcite, contrary to the natural carbonation where calcite is the dominant calcium carbonate polymorph formed.

It is contemplated that other waste materials of similar composition as RCF, i.e. rich in carbonatable Ca and/or Mg phases, e.g. hydrates, fly ashes, slags and mixtures thereof, can be carbonated to provide highly reactive SCM in the same way as concrete fines. Rich in carbonatable Ca and/or Mg phases means that at least 12.5 wt.-% of the waste material calculated as oxides is CaO and/or MgO and at least 80 wt.-% of the CaO and MgO is in carbonatable phases before carbonation. Preferably, CaO and/or MgO constitute at least 20 wt.-%, more preferably at least 30 wt.-% and most preferred at least 50 wt.-% of the waste material. Preferably, at least 85 wt.-%, more preferably at least 90 wt.-% of the CaO and MgO are in carbonatable phases. Thus, while a part of the carbonatable CaO and MgO in the waste material might be already carbonated before carbonation, at least 10 wt.-% of the material calculated as oxides is carbonatable but not yet carbonated CaO and/or MgO.

The method for manufacturing a supplementary cementitious material from recycled concrete fines requires RCF in the form of suitably treated demolished concrete as feed. Thus, after demolishing concrete building structures the coarse demolition waste is crushed and ground in a manner known as such to provide recycled concrete fines that consist mostly of the ground binder paste. Usually, parts of the fine parts of the original aggregate are present. Original aggregate and non-concrete parts of the demolishing waste are separated by crushing, separation steps if needed (e.g. screening to separate coarse particles and extracting metal with a magnet) and grinding. It is possible but not preferred to rely on grinding/crushing in the presence of high $CO_2$ concentration as suggested in US 2015/0210594 A1, since it would require a drying step. However, crushing (and possibly pre-grinding) in a gas atmosphere containing carbon dioxide, preferably enriched in carbon dioxide, is useful and one preferred embodiment of the method according to the present invention.

The chemical and mineralogical composition in terms of oxides and phases of four typical RCF (which contain fine aggregates being mostly quartz) is as follows:

TABLE 1

|  | RCF 1 | RCF 2 | RCF 3 | RCF 4 |
| --- | --- | --- | --- | --- |
| chemical composition [wt-%] | | | | |
| LOI | 17.98 | 21.59 | 12.23 | 7.89 |
| $SiO_2$ | 43.02 | 43.63 | 54.72 | 74.15 |
| $Al_2O_3$ | 6.38 | 5.70 | 6.32 | 3.64 |
| $Fe_2O_3$ | 3.02 | 2.74 | 2.36 | 1.43 |
| CaO | 24.39 | 21.51 | 18.29 | 10.44 |
| MgO | 1.39 | 1.22 | 1.81 | 0.90 |
| $K_2O$ | 0.80 | 0.76 | 1.00 | 0.77 |
| $Na_2O$ | 0.35 | 0.32 | 0.42 | 0.28 |
| $SO_3$ | 1.21 | 1.07 | 1.28 | 0.69 |
| mineralogical composition [wt-%] | | | | |
| Quartz | 28.3 | 28.7 | 39.1 | 58.4 |
| Calcite | 13.9 | 13.6 | 6.2 | 2.7 |
| Dolomite | 2.4 | 1.7 | — | — |

The particle size distribution determined by sieving or laser granulometry of RCF (Ca/Mg-rich waste material) useful as starting material for conversion into SCM according to the invention by carbonation grinding usually conforms to a particle size distribution determined by laser granulometry with a $d_{90} \leq 2$ mm, preferably with a $d_{90} \leq 1.5$ mm, and most preferably a $d_{90} \leq 1$ mm. Thus, typically rather coarse RCF from the crusher is used, since particle size reduction takes place in the mill coupled to the separator by carbonation grinding. In this respect, it is beneficial to integrate the crushing into the process and device according to the invention, to provide an optimum particle size of the RCF. If desired the RCF can also be adjusted in size e.g. be sieved before carbonation grinding. The RCF feed into the mill can also be mixed from different RCF to ensure a more homogenous composition or adjust the phase composition.

The concrete fines are subjected to carbonation grinding to convert them into SCM. Therein, the concrete fines are transferred into a mill, e.g. a vertical roller mill, horizontal ball mill, roller press, or impact mill. Carbon dioxide containing gas is introduced into the mill during grinding to provide a carbonating atmosphere containing 10 to 99 Vol.-% $CO_2$, preferably either 10 to 30 Vol.-% $CO_2$ or 50 to 90 Vol.-% $CO_2$. The temperature is adjusted to lie within 1 to 10° C. above the water dew point, preferably from 2 to 7° C. above the water dew point and most preferred from 3 to 6° C. above the water dew point. This typically results in a temperature from 60 to 90° C. inside the mill and fluidized bed reactor. For example, a gas temperature of 90° C. with a 7° C. lower water dew point corresponds to a water vapour concentration of 55 Vol.-%; whereas at 60° C. operation temperature and a water dew point of 57° C. the water proportion in the gas is 17 Vol.-%. This is the preferred operation range of temperature versus dew point. Generally the nearer the operation temperature is to the water dew point, the faster the absorption is, as the $CO_2$ molecules dissolve in the micro pores of the RCF; where the van der Waals forces promote a micro pore condensation. The bottom line for the operation temperature is the water dew point, where sludge and scaling is provoked. Thus, the temperature has to be kept above the water dew point by at least a slim margin. The required slim margin is a function of the heat losses, there should be no water condensation on cold spots such as the housing. This is irrespective of the level the process is operating at. But for practical reasons the higher the water concentration is the higher ought to be the difference between gas temperature and water dew point.

Suitable sources for the carbon dioxide containing gas are exhaust gases as directly received from a plant, e.g. a coal fired power plant or a cement plant, in a first embodiment. Typically, the plant will be nearby the mill, to allow transfer of the exhaust gas with a pipeline at low expense.

A typical exhaust gas from a rotary kiln for clinker manufacturing comprises 14-33 Vol.-% $CO_2$ depending on the clinkering technology, used fuels and raw materials, see e.g. "Carbon dioxide Capture and Storage: Special Report of the intergovernmental panel on climate change", P. Metz, Cambridge University Press, 2005, p. 79. These and similar exhaust gases from other sources like coal fired power plants can be used advantageously as the carbon dioxide containing gas, they are readily available and need no special equipment or consume energy for treating.

In one preferred approach exhaust gas from a cement plant operating in the so-called oxyfuel mode is used as the carbon dioxide containing gas. In this manufacturing mode the kiln and optionally also the precalciner/heat exchanger are fed with oxygen instead of air to avoid formation of nitrogen oxides. The exhaust gas withdrawn from such plants is richer in $CO_2$. Thus, oxyfuel exhaust gas provides a very advantageous carbonating atmosphere, comparable to one obtained by enriching "normal" exhaust gas in $CO_2$.

In another embodiment, a gas which is concentrated or has been enriched in carbon dioxide or liquefied carbon dioxide is used. The source gas can be an exhaust gas as described above having been concentrated in $CO_2$. Several methods for concentrating carbon dioxide in gases are known, for example exhaust gas recirculation (EGR), humidification (EvGT), supplementary firing (SFC) and external firing (EFC). Additionally, a carbonating atmosphere can be obtained from exhaust gases with separation methods by solvents, e.g. amine scrubbing technology, sorbents, e.g. zeolites and activated carbon, can be used to separate $CO_2$ from gas mixtures, and also membranes (gas separation membranes that allow one component in a gas stream to pass through faster than the others). Or cryogenics methods ($CO_2$ can be separated from other gases by cooling and condensation) or any other suitable method. Thereby, a gas comprising higher concentration of $CO_2$ is obtained with $CO_2$ concentration of up to 90% at industrial scale, see e.g. C. E. Baukal, "Oxygen-enhanced combustion", CRC press, 2013. Such treated gas is more expensive, but it allows faster carbonation and provides more flexibility in plant design and operation.

The lower operation temperatures of 60 to 80° C. are advantageous for the carbonation with e.g. kiln exhaust gases as carbonating atmosphere, typically providing 10 to 30% $CO_2$. The higher temperatures of 75 to 90° C. are expected to be useful for the carbonation with off-site collected and concentrated $CO_2$ having a concentration of 50 to 90 Vol.-%. The temperatures in the mill and the reactor will be almost equal. A slight increase e.g. due to heat of reaction or heat of grinding is expected to be compensated by losses due to convection and required temperature drops due to heat requirements for drying of feed material.

The usual gas retention time in the mill-reactor-filter system is from 10 to 30 seconds (gas path). The material retention time in the flue gas depends on the recycle rate which can be e.g. from 10 to 100 passes. Thus, a RCF particle could be in sum from 100 to 3000 seconds in the gas and on the filter bag. The particle density range in the reactor is usually from 10 to 100 $kg/m^3$ and the loss of particles towards the filter from 1 to 10 $kg/m^3$. So if a particle is recycled 10 times in a system with 10 seconds gas path retention it is subjected to carbonation for 100 seconds. If the density in the reactor is 10 times that of the feed to the reactor, a total retention time of 1000 seconds results. Usually though 50% of the particles are collected on the bag and stay on this for another 1000 to 3000 seconds. On average a residence time on the bag is then 1000 seconds for all particles in addition. Together the total average residence time is then 2000 seconds for the RCF particles, which is currently preferred. However, the average RCF retention time could be as short as 100 seconds when a low particle density in the reactor, a short gas path and a low recycle rate with almost no retention time on the bag filter is used. Usually, the RCF particles will be carbonated on average for times ranging from 10 seconds to 3 hours, preferably from 30 seconds to 1 hour, most preferably from 100 seconds to 45 minutes, by repeated circulation through the reactor and optionally also the mill. By this, a carbonation of at least 80 wt.-%, preferably at least 90 wt.-%, and most preferred at least 95 wt.-%, of the RCF particles is usually achieved.

In all embodiments it is preferred to adjust the temperature of the carbonating atmosphere inside the mill by heat exchange with available gas and material streams and/or heat the gas with the waste heat from the various device parts. Thus, exhaust gas used as the carbon dioxide containing gas providing the carbonating atmosphere can be heated by waste heat from the mill. If additional heat is needed it can be supplied by a burner, for example a gas or oil burner. One preferred way to decrease the temperature inside the mill is introducing water, e.g. spraying it into one of the pipelines circulating the carbonating atmosphere. It is also possible to cool an exhaust gas utilized as gas containing carbon dioxide by pre-heating the concrete fines with it.

The device according to the invention serves for concurrent grinding and carbonation of concrete fines achieving a sequestration of carbon dioxide at the same time. It comprises a mill adapted to receive concrete fines as a feed and a gas containing from 10 to 99 Vol.-% carbon dioxide to provide a carbonating atmosphere, a fluidized bed reactor connected to the mill and adapted to receive ground and partially carbonated concrete fines and the partially decarbonated gas from the mill for circulation, a separator for returning too coarse particles in the mill and passing fine enough ones to the reactor, temperature control means for adjustment of the temperature of the gas, and output means adapted to vent decarbonated gas and withdraw carbonated concrete fines and to recirculate the gas until it is decarbonated and the concrete fines until they are carbonated each to a desired degree.

The mill can be e.g. a vertical roller mill, a horizontal ball mill or a roller press. Preferably, a vertical roller mill is used. The mill is adapted to receive concrete fines or other waste material rich in carbonatable Ca and/or Mg phases as feed. The mill is further adapted to receive a gas containing carbon dioxide as carbonating atmosphere. A two-stage mill could be used but is not expected to provide additional benefit.

Preferably, the gas is either an exhaust directly from a nearby plant or liquefied or compressed carbon dioxide. When exhaust gas shall be used directly, it can reach the mill via one or more heat exchangers to adjust the temperature. In case liquefied carbon dioxide is used, means for evaporating/decompressing and pre-heating the carbon dioxide are foreseen. Alternatively, the gas can be a mixture from exhaust gas and liquefied or compressed carbon dioxide or an exhaust gas enriched in carbon dioxide.

The mill is connected to a separator allowing to recirculate particles of the concrete fines feed not ground fine enough and only pass fine enough particles on into the fluidized bed reactor. Any known statical or dynamical separator can be used, the type is not important, an internal separator is also possible. The particle size distribution determined by laser granulometry of the RCF entering the reactor should have a $d_{90} \leq 500$ μm, preferably a $d_{90} \leq 200$ μm, and most preferably a $d_{90} \leq 100$ μm. Particles with a size below 25 μm are typically filtered out in the first pass through the bag filter. Preferably the particle size distribution has a Rosin-Rammler slope n from 0.6 to 1.4, more preferably from 0.7 to 1.2.

The temperature control means for adjustment of the temperature of the gas typically comprise a heating means and a cooling means as well as temperature measurement means. Suitable are e.g. water injection to cool or direct heating by a burner. The water injected will narrow the gap between operation temperature and water dew point to typically 1 to 10° C. For example, a kiln exhaust gas can heat-exchange the recycle gas to compensate for heat losses. Or the system replenishes the heat losses by grinding heat and if needed by natural gas burning. However, if the RCF contains hard to grind material the heat of grinding—by electrical power—may be in excess, and the gas leaving the grinding unit has to be cooled. For example cooling water reduces the gas temperature. The gas can also be constantly replenished by gas which has bypassed the system. This would then be reduced in temperature by water, at the same time increasing the water dew point.

In one embodiment a water supply is provided as the cooling means. Water can be introduced, e.g. sprayed or trickled into a pipeline for circulating or transferring gas, to adjust water content and/or temperature inside the mill by dosing suitable amounts of water into the carbonating atmosphere. It is advantageous to measure the water consent in the carbonating atmosphere or a gas becoming it, e.g. by Fourier Transform Infrared spectroscopy. The water dew point can then easily be calculated and the gas temperature adjusted accordingly.

The device may comprise a gas-to-gas heat exchanger for heating the carbonating atmosphere, especially reheating the recirculated gas. Typically, the heat exchanger receives hot gas from other steps, e.g. from a crusher used to provide the concrete fines or a part of the exhaust gas.

Especially for process start up it is useful to provide a burner for (re)heating the recirculated carbonating atmosphere. The fuel can be e.g. oil or gas, preferably gas is used, e.g. natural gas. The exhaust gas from the burner is to usually vented. It can also be fed to the mill, in particular when the temperature is too low.

The fluidized bed reactor serves to complete carbonation of the concrete fines and decarbonation of the gas, i.e. sequestration of the carbon dioxide, to the desired degree. The temperature, pressure (usually ambient pressure), and gas flow are the same or similar to the conditions in the mill. The particle load and residence time are adjusted independently from the mill, but can be similar, too. The preferred particle load is at least 10 kg/m$^3$, preferably at least 100 kg/m$^3$. In the filter a load up to 10 kg/m$^3$, preferably up to 1 kg/m$^3$ is advantageous.

Further, means are provided that allow withdrawal of carbonated concrete fines and decarbonated gas. Some concrete fines and gas are recirculated into the fluidized bed reactor and/or mill. To this end, particles are preferably recirculated into the fluidized bed reactor and gas into the mill. Depending on recycle rate, fineness of the particles, the temperature and carbon dioxide concentration influence the carbonation rate and will be adapted to each other to achieve the desired carbonation degree and sequestration. For example, about 95% carbonation of the RCF and a decrease of $CO_2$ in the gas of about 20% from e.g. 20 Vol.-% to 16 Vol.-% or from 30 Vol.-% to 25 Vol.-% is advantageous for manufacturing SCM. For sequestering $CO_2$ a decrease to a content of below 5 Vol.-%, preferably below 1 Vol.-% is desirable.

The means for withdrawal and recirculation are preferably a combination of a fabric filter and a rotary valve or V-slot turning gate.

The device can either receive crushed concrete demolition waste as concrete fines feed or comprise a crusher and separator to provide them. The crusher serves to crush coarse concrete demolition waste. The separator is necessary to withdraw the coarse fraction mainly containing aggregate and any foreign materials like metals from the concrete fines. Typically the coarse fraction is separated off by screening. Foreign materials are separated by means known as such, e.g. a magnet for steel. If the crusher is part of the device, its heat generation can be utilized for temperature adjustment of the gas containing carbon dioxide and/or the crusher can serve to sequester some of the carbon dioxide during crushing.

Usual and well known means for measuring temperature and pressure, for circulating gas (typically fans), for splitting gas streams, for splitting particle streams, and conducts to transfer gases and particles complete the device.

It is possible to add grinding aids, preferably in an amount from 0.001 to 1 wt-% with respect to the total concrete fines feed, to the RCF. Suitable materials include alkanolamines, for example primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or mixtures thereof.

Furthermore, it is possible to add admixtures that modify properties of the final binder and building material made from it already to the concrete fines feed (usually those will be added to the binder). Often used admixtures are water reducing agents and plasticizers like for example, but not exclusively, organic compounds with one or more from carboxylate, sulfonate, phosphonate, phosphate or alcohol functional groups. These serve to achieve a good consistency, i.e. flowability, of the paste with a smaller amount of water. Since a decrease of w/b normally provides an increase of strength, such admixtures are commonly used. Air entraining agents are also able to improve flowability and can be used fore this aim or are need for other reasons such as, but not limited to, density modifications, compactibility improvements etc.

Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxycarboxylic acids and their salts, phosphonates, sugars (saccharides). It is also possible to add admixtures that are designed to modify the rheology properties to control the setting time, i.e. plasticizers and superplasticizers. Those can have a retarding impact as well, e.g. lignosulphonates, polycarboxylic acids, etc.

All admixtures are used in the amounts known as such, wherein the amount is adapted to a specific binder and special needs in the known manner.

Additives can be added to the concrete fines feed or usually to the binder as well such as e.g. fillers, pigments, reinforcing elements, self-healing agents etc. All these can be added in the amounts known per se.

As a rule, the SCM obtained by carbonation grinding has a suitable fineness for use in a composite binder or as super sulfated cement or geopolymer binder. If the fineness of the SCM is not sufficient, or if an especially high fineness is desired, the SCM can be ground further in known devices and in a known manner, either together or without other binder components, e.g. cement. Grinding aids can be added or may be present from grinding the demolished concrete.

The reactivity index of the carbonated RCF, i.e. the SCM according to the invention, is at least 1.1 times, preferably 1.2 times, most preferred 1.3 times, that of limestone (LL according to EN 197-1) at the same replacement level of 30% of CEMI32.5 R according to EN 197-1, at 28 days, in mortar. The reactivity index is defined as the ratio of the EN 196-1 mortar strength of the SCM-containing composite binder over the strength of a limestone-containing composite binder.

Thus, the SCM according to the invention is suitable to make composite binders, super sulfated cements, geopolymer binders etc. analogously to known SCMs such as ground granulated blast furnace slag, fly ash and oil shale. If the fineness after carbonation is not as desired, i.e. comparable to that of the cement, appropriate fineness is achieved by grinding the SCM according to the invention and/or by co-grinding it with the cement.

The reactivity of the obtained supplementary cementitious material allows its use according to the invention in composite binders in an amount from 1 to 80 wt-%, preferably from 5 to 50 wt-%. Suitable cements are Portland cement (OPC), calcium sulfoaluminate cement (CSA), calcium aluminate cement (CAC) and other hydraulic cements including lime. The cement is usually present in an amount from 5 to 95 wt-%, preferably 30 to 80 wt-% in the binder.

In addition, usual additives and/or admixtures can be used as described above for adding to the RCF. Naturally, the amounts of all components in a specific binder add up to 100%, so if SCM and cement are the sole components their amounts add up to 100%, when there are other components, the amount of SCM and cement is less than 100%.

Also, further SCMs like slag, fly ash and other main cement constituents according to EN 197-1 can be contained. Preferably, only the SCM according to the invention is contained since that is technically easier. Fly ash is often added to concrete, this is also possible for concrete from the composite binder according to the invention.

The fineness of the cement and SCM are adjusted to the intended use as known per se. Typically, a particle size distribution determined by laser granulometry with a $d_{90} \leq 1000$ μm, preferably a $d_{90} \leq 500$ μm, more preferably a $d_{90} \leq 200$ μm, and most preferably a $d_{90} \leq 100$ μm is suitable and a Rosin-Rammler slope n from 0.6 to 1.4 is preferred, more preferably from 0.7 to 1.2. Usually, the cement has a $D_{90} \leq 90$ μm, preferably 60 μm and a slope n from 0.6 to 1.4, preferably from 0.7 to 1.2, determined by laser granulometry and calculated by the Rosin-Rammler model.

Likewise, the super sulphated cement or geopolymer binder made with the SCM according to the invention is otherwise made as known.

The composite binder, super sulphated cement, geopolymer binder etc. according to the invention is useful to applications known per se for cements according to EN 197-1 and other common hydraulic binders.

The main advantage of the method and device according to the invention is the possibility to carbonate the RCF fast and adjust conditions so that very reactive SCM is obtained. The recirculation of the gas allows a more or less complete sequestration of carbon dioxide and eventually other acidic pollutants in exhaust gases at the same time. The possibility to use heat generated inherently by the process, e.g. by grinding and gas conveying, to heat the carbonating atmosphere significantly improves the overall energy balance.

The direct use of exhaust gas saves energy and effort for concentrating carbon dioxide and transport. It completes or replaces exhaust gas treatment devices in plants to more easily conform to desired cleaning aims. Thus, extra investment costs are comparably low. Combination with a cement plant is especially advantageous, since both SCM and aggregate from the crusher can be used directly for new concrete.

The indirect carbonation using gas concentrated in $CO_2$, enriched with it or even liquefied $CO_2$ allows even faster carbonation and thus manufacturing of SCM. Although concentration and liquefaction of carbon dioxide consume energy and need additional equipment, this embodiment allows more flexibility in plant design. Only the carbon dioxide capture needs to be installed at the point of exhaust gas generation, the device according to the invention can be installed centrally and have a bigger scale. Its operation is independent of that of the exhaust gas generating plant.

The invention will be illustrated further with reference to the attached figures, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit. The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

BRIEF DESCRIPTION OF THE DRAWINGS

In the figures

DETAILED DESCRIPTION OF THE INVENTION

Figure 1:
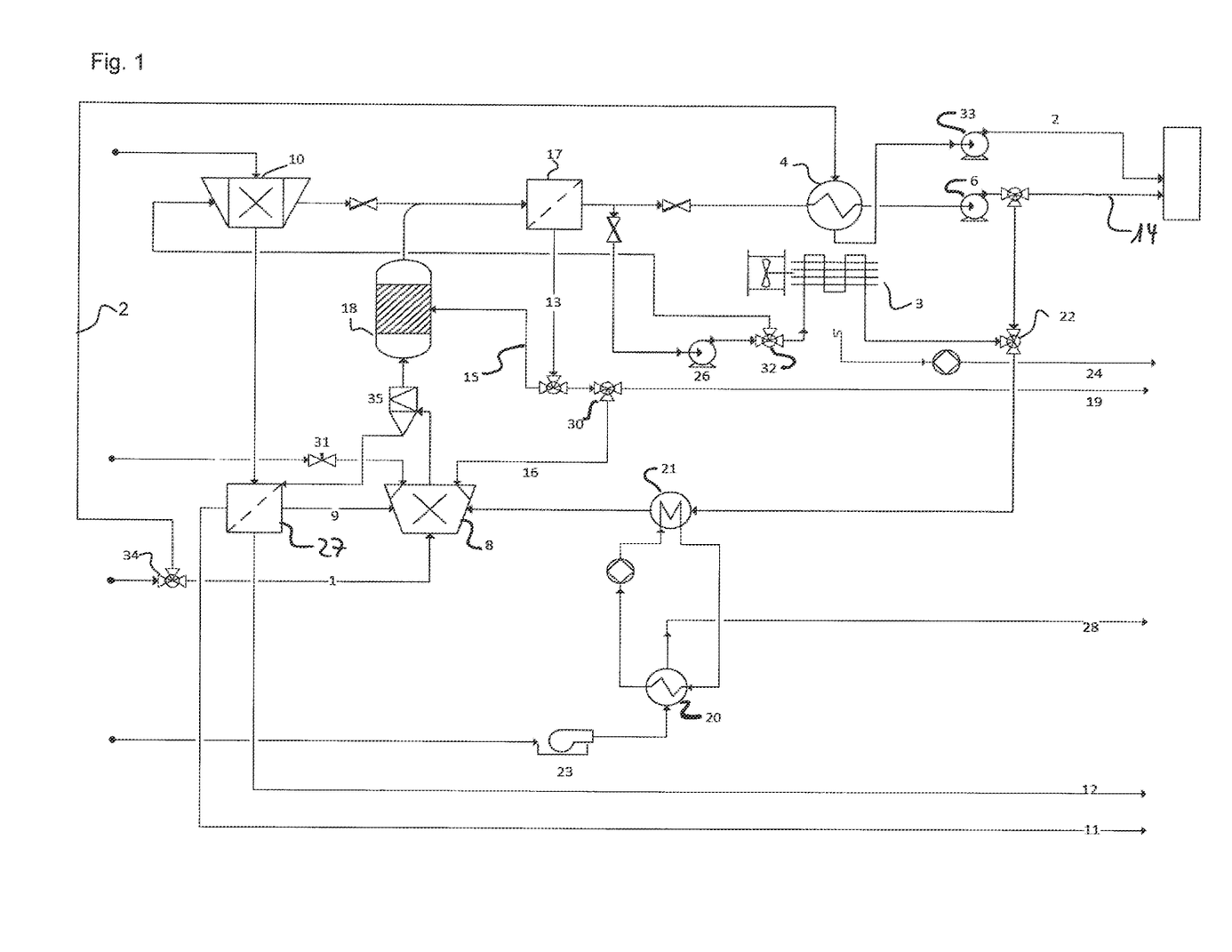
FIG. 1 illustrates a first carbonation grinding process.

FIG. 1 illustrates a first carbonation grinding method and device directly using exhaust gas as gas containing carbon dioxide. The pipelines transferring gas and/or particles are shown as lines, wherein the flow direction of gas and particles, respectively, is indicated with an arrow.

In FIG. 1 the kiln exhaust gas from a cement plant is conveyed in a so-called tail-end configuration to the device according to the invention. At choice the entire kiln exhaust gas or only a portion 1 is utilized for the carbonation and forms the gas containing carbon dioxide. During carbonation the $SO_2$, HCl and HF present in the exhaust gas will also be absorbed by the concrete fines along with the $CO_2$.

If a portion of kiln gas 2 is bypassing the carbonation grinding it is preferably used for heat exchange raising the water dew point in the mill 8/reactor 18 and vented through the same stack 14 as the gas portion 1 being decarbonated in the mill 8. Mill 8 can be a vertical roller mill, a horizontal ball mill, an impact mill or a roller press.

For start up and in the event of a heat deficiency due to excess moisture of the concrete fines feed 9, the deficient heat can be provided by a burner 23 via heat exchangers 20 and 21 or by the heat contained in the portion 2 of the kiln exhaust gas which is bypassing the carbonation grinding. For this a gas-to-gas heat exchanger 4 can be advantageously utilized.

To control the temperature and the water dew point in the mill 8 and fluidized bed reactor 18 a portion of the treated kiln gas is to taken to a flue gas cooler and condenser 3. The condenser is air-cooled and the conditioning temperature is controlled by a fan cooling the air feed. The to be recycled gas can also be mixed with the some of the by-pass gas to adjust the temperature above the water dew point again. The heat for this is provided by the inherent heat of the bypass gas. It has to be understood, that a main cost driver for the operation is if additional heat has to be provided. Therefore can be more economical to bypass a large portion of the gas and extract the $CO_2$ than trying to absorb all the $CO_2$.

The water which condenses during cooling of the flue gas is removed via siphon 5 and taken away as condensate 24 via a pump. The condensed water can be utilized for other applications, e.g. for concrete manufacturing or any other industrial process tolerable or in need of carbon dioxide containing water.

The concrete fines feed 9 is prepared by means of a crusher 10, including a separator 27 for extraction of foreign objects 11 such as metal and plastic pieces and withdrawal of the coarse but low-Ca portion 12 for use as concrete aggregate, e.g. by screening. The mill 8 and the crusher 10 as well as the gas (water and eventual burner exhaust gas) and air drafted or developed within the device are vented to the system fabric filter 17 for de-dusting and collection of the (partially) carbonated concrete fines 13.

The mill 8 is fed with concrete fines 9 from the crusher 10, which have a maximum particle diameter from 100 μm to 4 mm, preferably to 2 mm. The fines 9 are fine ground in the mill 8 to an average particle diameter in the range from 10 to 50 μm. The mill 8 has a static or dynamic separator 35 to control the fineness of the concrete fines. The separator 35 passes too coarse particles back into the mill 8 via the separator 27 of the crusher. Of course, it is also possible to convey too coarse particles directly into the mill or the concrete fines feed.

The system fabric filter 17 collects the ground and (partially) carbonated concrete fines 13 leaving the fluidized bed reactor 18. At demand and in the event that the concrete fines are not fully carbonated, the partially carbonated concrete fines 15 are fed back to the circulating fluidized bed reactor 18. When these have to be further ground to activate the material, they are fed back as particles 16 to the mill 8.

A significant portion of the $CO_2$ is already absorbed in the mill 8 and to a smaller extent in the crusher 10. The remaining portion is absorbed in the circulation fluidized bed reactor 18. As the concrete fines have to be brought into contact with the gas containing $CO_2$ multiple times, a continuous returning of the fines to the mill 8 is arranged by storing the concrete fines in the hopper of the filter 17. It is also possible to recycle the partially carbonated concrete fines into the fluidized bed reactor 18 or into the mill 8 and the reactor 18.

The back-dosing of the stored fines to the mill 8 (or to the reactor 18 orifice—not shown) and the withdrawal as carbonated concrete fines 19 is enabled by e.g. a rotary valve or V-slot turning gate arrangement 30 or any other suitable means. The rate of recirculation to the mill 8 or reactor 18 is on average 10 to 100 dependent on the milling intensity and achieved surface activity. The usual solid material load in the reactor 18 is 10 to 100 kg/m³ (S,T,P). To facilitate the correct hold-up in the reactor 18, the feed grain size is adjusted so that 80 wt.-% of the feed has a aprticle size in the range from 25 to 100 μm, which is also a function of the chosen vertical speed, which is typically 5 to 9 m/s.

The temperature of the carbonating atmosphere in the mill 8 and reactor 18 is kept within a range of 2 to 7° C. above water dew point. This usually ranges from 58 to 83° C. Thus, the circulating gas, mainly comprising $H_2O$, $CO_2$, $N_2$ and $O_2$ should have a temperature from 60 to 90° C. and a water content from 17 to 55 Vol.-%.

In the event of excess heat in the mill 8 e.g. caused by hard material, the required cooling is arranged by injection of water in the mill 8 via water control valve 31. The added water also raises the water dew point and facilitates dissolving of $CO_2$ into the water rich micro pores of the RCF.

The main purpose of the induced draft fans 6 and 26 is to provide the necessary gas flow in the device and overcome a developed pressure drop. In particular, the heat exchanger 4, the flue gas cooler and condenser 3, the mill 8, the reactor 18, and the filter 17 typically develop an overall combined pressure drop of 8 to 16 kPa. The specific particle load of the system is 1 to 5 kg/m³ in the routing from the mill 8 to the filter 17. After the filter 17 the particle load to the heat exchanger 4 and cooler and condenser 3 should ideally be <5 mg/Nm³ to prevent scaling at the heat exchanger 4 and the heat exchange surfaces of the cooler and condenser 3.

The distribution of cycle gas split to the mill 8 and the crusher 10 is controlled by a gas splitter 32 and by trimming the fans 6 and 26, which results in the required lift speed in the mill 8 as well as in the crusher 10.

An induced draft fan 33 is also foreseen in the line of the bypassed gas portion 2 of exhaust to compensate the pressure drop of the heat exchanger 4. Alternatively or additionally, the gas pressure at the splitting point 34 is positive to overcome the drag developed by the heat exchanger 4 in that line. Usually a surplus pressure of 5 to 20 mbar is sufficient to make an additional induced draft fan 33 superflous. This is also the usual pressure surge requirement of the induced draft fan 33.

For start-up of the system a secondary heat exchanger 21 is installed to pre-heat the device parts. The necessary heat is provided by burning of oil or gaseous fuels in the burner 23. Ideally, natural gas or any other gas composed of hydrocarbons is used as fuel. The burner off gas generated during the heating up is vented as waste gas 28.

Figure 2:
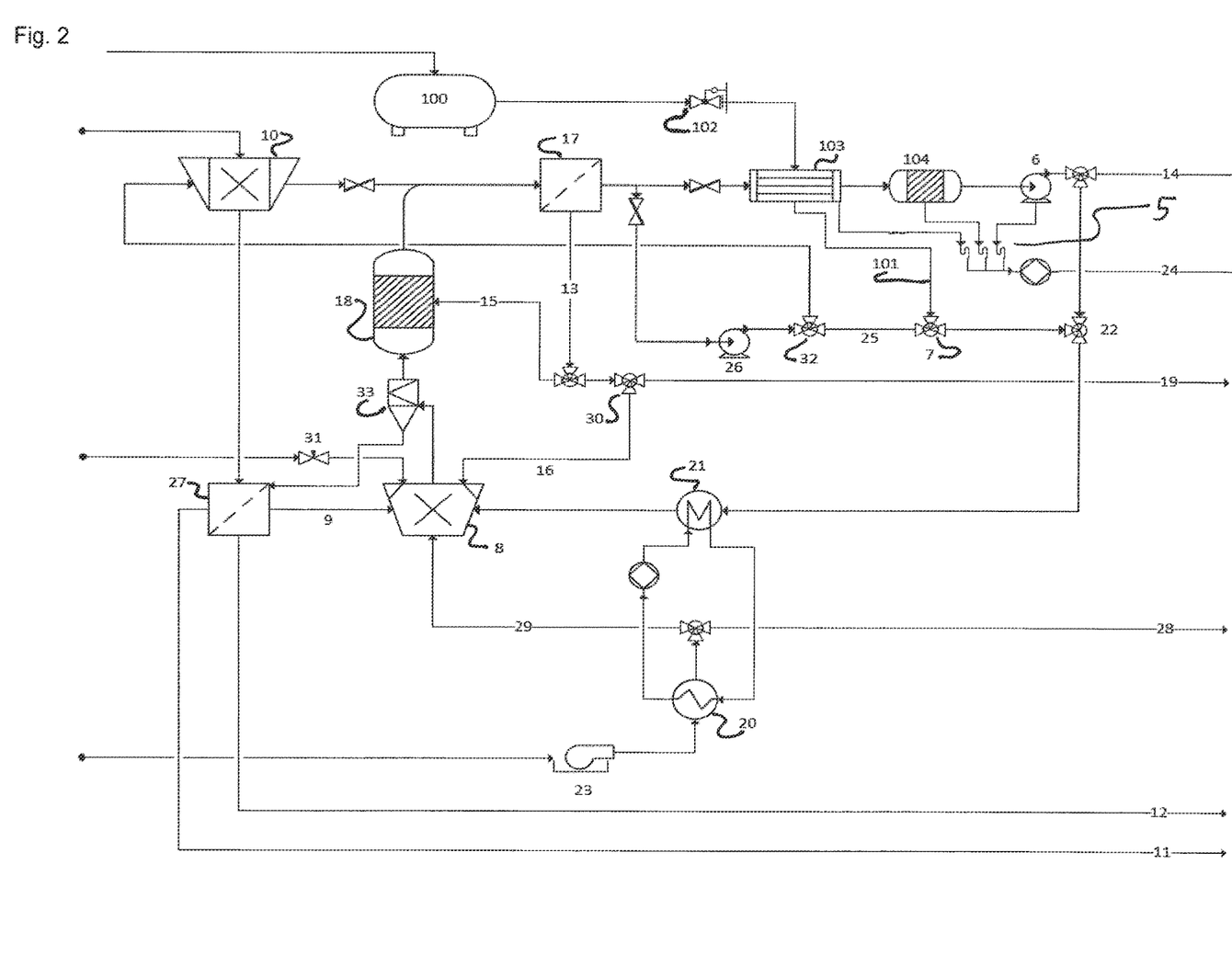
FIG. 2 illustrates a second carbonation grinding process.

FIG. 2 illustrates a method and device using liquefied carbon dioxide to provide the gas containing carbon dioxide. Many parts of the device are identical to the embodiment shown in FIG. 1 and have the same reference numbers, therefore.

In FIG. 2 externally produced and concentrated liquefied $CO_2$ is delivered by pipeline, truck or rail to a $CO_2$ hold 100 forming part of the device. The feed $CO_2$ has to be evaporated and pre-heated before introducing it into the mill 8 for carbonation purposes. Heat is required to prevent icing of the machinery elements during the decompression and evaporation of the liquefied $CO_2$. This heat is mainly provided by a heat exchanger 103, to a smaller portion by external heating via burner 23 and heat exchangers 20 and 21, but foremost by power demand and subsequent heat development during crushing in the crusher 10 and grinding in the mill 8 as well as from power demand for the gas circulation from induced draft fans 6 and 26.

For this, the liquefied $CO_2$ is dosed via a valve 102 to a combined cross flow/counter current type of pre-heater and evaporator forming the heat exchanger 103. Within the heat exchanger 103, the $CO_2$ is also decompressed to ambient pressure. By heat exchange, the $CO_2$ is pre-heated, evaporated and heated in a combined step to near actual operation temperature. Thereafter the heated $CO_2$ 101 is mixed into the gas stream 25 at mixing point 7 before it is joined with the bypass-gas guided around the heat exchanger 103 at a mixing point 22.

By the above-described heat recovery and introduction of the heated $CO_2$ 101 at point 22, the water vapor purged via the stack 14 is colder than the circulating gas and by this, the heat loss is minimum. Generally, the heat balance control at the heat exchanger 103 is facilitated by the bypass of cycle gas 25, which has also its own induced draft fan 26. Usually, a temperature reduction is triggered by decompression of the gas in the mill 8, reactor 18 and filter 17. Further, gas temperature losses of 3° C. are possible by convection. But compression at the system fans 6 and 26 reestablishes the temperature level. Therefore, at a total pressure drop of 70 mbar the temperature depression can be 7° C. but the actual temperature loss which has to be compensated is less.

During the heating and evaporation process step of the $CO_2$, a part of water vapor contained in the partially decarbonated gas coming from the mill 8 and crusher 10 condenses on the heat exchange surfaces of the heat exchanger 103. Additionally, a Chevron type droplet separator 104 located in the outlet of heat exchanger 103 collects droplets, which would otherwise escape along with the vented decarbonated gas. In addition, this condensate 24 is removed via a siphon 5 and drained.

Nevertheless, some droplets remain dispersed in the partially decarbonated gas or develop due to compression. These are separated from the partially decarbonated gas by the centrifugal forces in the induced draft centrifugal fan 6. The high tip speed of the impeller propels the droplets to the fan wall, where these collect on the surface and move by gravitation to the drain located in the lower point of the fan casing.

The condensed water can be utilized for other means, e.g. for concrete manufacturing or any other industrial process tolerable or in need of carbon dioxide containing water. The gaseous and preheated $CO_2$ 101 is mixed into the cycling gas 25 and thereafter taken to the mill 8. Mill 8 can be a vertical roller mill, a horizontal ball mill, an impact mill or a roller press.

The concrete fines feed 9 is prepared by means of a crusher 10, including a separator 27 for extraction of foreign objects 11 such as metal pieces and withdrawal of the coarse but low-Ca portion 12 for use as concrete aggregate, e.g. by screening. The mill 8 and the crusher 10 as well as the gas and air drafted or developed within the mill and reactor by carbonation are vented to the system fabric filter 17 for de-dusting and collection of the (partially) carbonated concrete fines 13.

The mill 8 is fed with concrete fines 9 from the crusher 10, which are fine ground in the mill 8 to an average particle diameter in the range from 10 to 50 μm. The mill 8 has a static or dynamic separator 35 to control the fineness of the concrete fines. The separator 35 passes too coarse particles back into the mill 8 via the separator 27 of the crusher. Alternatively, these particles can be recirculated directly into the mill 8.

The system fabric filter 17 collects the ground and (partially) carbonated concrete fines 13 leaving the fluidized bed reactor 18. At demand and in the event that the concrete fines are not carbonated to the desired degree, the partially carbonated concrete fines 15 are fed back to the circulating fluidized bed reactor 18. When these have to be further ground to activate the material, they can be fed back as particles 16 to the mill 8.

A significant portion of the $CO_2$ is already absorbed in the mill 8 and to a smaller extent in the crusher 10. The remaining portion is absorbed in a fluidized bed reactor 18. As the concrete fines have to be brought into contact with the feed $CO_2$ multiple times, a continuous returning of the fines to the fluidized bed reactor 18 and/or the mill 8 is arranged by storing the concrete fines in the hopper of the filter 17.

The back-dosing of the stored material to the mill 8 or to the reactor 18 orifice and the withdrawal as carbonated concrete fines 19 is enabled by e.g. a rotary valve or V-slot turning gate arrangement 30. The average number of recirculation to the mill 8 or reactor 18 is from 10 to 100 dependent on the milling intensity and achieved surface activity. The usual solid material load in the reactor 18 is 10 to 100 kg/m$^3$ (S,T,P). To facilitate the correct hold-up in the reactor 18, the feed grain size has to be in a certain range, which is also a function of the chosen vertical speed, which is typically 5 to 9 m/s.

The temperature of the carbonating atmosphere in the mill 8 and reactor 18 is kept within a range of 2 to 7° C. above water dew point. This usually ranges from 58 to 83° C. Thus, the circulating gas, mainly comprising $H_2O$, $CO_2$, $N_2$ and $O_2$ should have a temperature from 60 to 90° C.

In the event of excess heat, the required cooling is arranged by injection of water in the mill 8 via water control valve 31. Alternatively, the water dew point can be adjusted via the valve (31).

The main purpose of the induced draft fans 6 and 26 is to provide the necessary gas flow in the device and overcome a developed pressure drop. In particular, the heat exchanger 103, the mill 8, the reactor 18 and the filter 17 typically develop an overall combined pressure drop of 8 to 16 kPa. The specific particulate load of the system is 1 to 5 kg/m$^3$ in the routing from the mill 8 to the filter 17. After the filter 17 the particle load to the heat exchanger 103 should ideally be <5 mg/Nm$^3$ to prevent scaling at the exchange surfaces of the heat exchanger 103.

The distribution of cycle gas split to the mill 8 and the crusher 10 is controlled by a gas splitter 32 and by trimming the fans 6 and 26, which results in the required lift speed in the mill 8 as well as in the crusher 10.

For start-up of the system a secondary heat exchanger 21 is required to pre-heat the device parts. The necessary heat is provided by burning of oil or gaseous fuels in the burner 23. Ideally, natural gas or any other gas composed of hydrocarbons is used as fuel. The generated burner off gas is vented as waste gas 28 during the heating up. In the event of a heat deficiency in the gas cycle after heating up, the burner off-gas can at least partially be guided to the mill 8. However, usually the grinding heat, the crushing heat and the heat developed during gas conveying is sufficient to drive the process.

LIST OF REFERENCE NUMBERS 1 gas containing carbon dioxide (kiln gas portion to mill)
2 kiln exhaust gas portion bypassing mill
3 gas cooler and condenser
4 gas-to-gas heat exchanger
5 condensate collection siphons
6 induced draft fan
7 mixing point
8 (vertical roller) mill
9 concrete fines feed
10 (pre-)crusher
11 foreign or largely non-mineral portion of the crushed concrete
12 recyclable coarse fraction minerals
13 concrete fines, partially carbonated
14 decarbonated gas to stack
15 concrete fines feed back to the circulating fluidized bed reactor
16 too coarse concrete fines
17 system fabric filter
18 circulating fluidized bed reactor
19 carbonated concrete fines
20 heat exchanger
21 heat exchanger
22 mixing point
23 burner
24 condensate
25 recycle gas
26 induced draft fan
27 three-way screening system
28 burner waste gas
29 burner off gas to mill
30 solid control valve or splitter arrangement
31 cooling water injection
32 crusher feed gas splitter
33 static separator
100 liquid and pressurized carbon dioxide hold
101 evaporated and heated carbon dioxide
102 carbon dioxide dosing unit
103 heat-exchanger
104 droplet separator

What is claimed is:

1. A method for manufacturing supplementary cementitious material and sequestering $CO_2$ by carbonating concrete fines comprising the steps:
   grinding the concrete fines obtained from crushed concrete demolition waste in a mill at a temperature from 1 to 10° C. above the water dew point in a carbonating atmosphere provided by a gas containing from 10 to 99 Vol.-% $CO_2$,
   circulating the ground and partially carbonated concrete fines in a fluidized bed reactor in contact with the carbonating atmosphere, and
   withdrawing decarbonated gas and carbonated concrete fines with recirculation of some of the gas and concrete fines to the reactor and/or mill, wherein at least 80 wt.-% of the concrete fines are carbonated.

2. The method according to claim 1, wherein the concrete fines are adjusted to a particle size distribution determined via sieving or laser granulometry with a $d_{90} \leq 2$ mm.

3. The method according to claim 1, wherein the temperature is adjusted to a range from 2 to 7° C. above the water dew point.

4. The method according to claim 1, wherein the carbonating atmosphere contains from 10 to 30 Vol.-% $CO_2$ or from 50 to 90 Vol.-% $CO_2$.

5. The method according to claim 1, wherein the carbonating atmosphere is an exhaust gas from a coal fired power plant, a cement plant or a cement plant operating in an oxyfuel mode, or a gas concentrated in $CO_2$.

6. The method according to claim 1, wherein the ground and partially carbonated concrete fines are recirculated on average 10 to 100 times to the reactor and/or the mill.

7. The method according to claim 1, wherein the carbonating atmosphere is at ambient pressure and fans are used to provide draft and compensate a developed pressure drop.

8. The method according to claim 1, wherein at least 80 wt.-% of the concrete fines are carbonated.

9. The method according to claim 2, wherein the concrete fines are adjusted to a particle size distribution determined via sieving or laser granulometry with a $d_{90} \leq 1.5$ mm.

10. The method according to claim 3, wherein the concrete fines are adjusted to a particle size distribution determined via sieving or laser granulometry with a $d_{90} \leq 1$ mm.

11. The method according to claim 1, wherein the temperature is adjusted to a range from 3 to 6° C. above the water dew point.

12. The method according to claim 4, wherein the temperature is adjusted to a range from 2 to 7° C. above the water dew point.

13. The method according to claim 6, wherein the temperature is adjusted to a range from 2 to 7° C. above the water dew point.

14. The method according to claim 12, wherein the ground and partially carbonated concrete fines are recirculated on average 10 to 100 times to the reactor and/or the mill.

15. The method according to claim 13, wherein at least 95 wt.-%, of the concrete fines are carbonated.

16. A device for sequestering $CO_2$ and carbonation of concrete fines comprising a mill with separator adapted to receive a concrete fine feed and a gas containing from 10 to 99 Vol.-% $CO_2$ as carbonating atmosphere, a fluidized bed reactor connected to the mill and adapted to receive partially carbonated and ground concrete fines from the mill and the partially decarbonated gas for carbonation recirculation, and output means adapted to withdraw decarbonated gas and carbonated concrete fines and to recirculate the gas until it is decarbonated and to recirculate the concrete fines until they are carbonated to a desired degree.

17. The device according to claim 16, additionally comprising a crusher with means for separating concrete fines from particles reusable as aggregate and foreign matter contained, for providing the concrete fines from concrete demolition waste.

18. The device according to claim 16, wherein the output means are a fabric filter and a rotary valve or V-slot turning gate.

19. The device according to claim 16, additionally comprising a water supply as cooling means for adjusting the temperature in the mill and/or reactor as well as the water content in the carbonating atmosphere.

20. The device according to claim 16, additionally comprising a gas-to-gas heat exchanger and/or burner for adjusting the temperature of the carbonating atmosphere.

21. The device according to claim 16, additionally comprising one or more induced draft fans to provide a gas flow in the device and/or to compensate a developed pressure drop.

22. The device according to claim 17, wherein the output means are a fabric filter and a rotary valve or V-slot turning gate.

23. The device according to claim 22, additionally comprising one or more of:
a water supply as cooling means for adjusting the temperature in the mill and/or reactor as well as the water content in the carbonating atmosphere,
a gas-to-gas heat exchanger and/or burner for adjusting the temperature of the carbonating atmosphere,
one or more induced draft fans to provide a gas flow in the device and/or to compensate a developed pressure drop.

* * * * *